(12) United States Patent
Seguin et al.

(10) Patent No.: US 7,480,423 B2
(45) Date of Patent: Jan. 20, 2009

(54) ALL-FIBER PHASE CONTROLLED DELAY INTERFEROMETER AND METHOD OF MAKING THE SAME

(75) Inventors: François Seguin, Beaconsfield (CA); Denis-Alexandre Brulotte, Montreal (CA); Julien Tremblay, Blainville (CA); Claude Deslisle, Varennes (CA); Alexandre Wetter, Montreal (CA); Denis Bouchard, Laval (CA); François Gonthier, Ville Mont-Royal (CA)

(73) Assignee: ITF Laboratories Inc., Montreal, Quebec (CA)

( * ) Notice: Subject to any disclaimer, the term of this patent is extended or adjusted under 35 U.S.C. 154(b) by 280 days.

(21) Appl. No.: 11/354,647

(22) Filed: Feb. 16, 2006

(65) Prior Publication Data

US 2006/0198580 A1 Sep. 7, 2006

(30) Foreign Application Priority Data

Mar. 4, 2005 (CA) .................... 2499651

(51) Int. Cl.
*G02F 1/01* (2006.01)
*G02B 6/26* (2006.01)
*G02B 6/42* (2006.01)

(52) U.S. Cl. .............. 385/1; 385/31; 385/32; 385/39; 385/40; 385/43; 385/50

(58) Field of Classification Search .......... 385/1, 385/32

See application file for complete search history.

(56) References Cited

U.S. PATENT DOCUMENTS

| 5,044,715 | A | * | 9/1991 | Kawachi et al. ............ 385/42 |
| 5,295,205 | A | * | 3/1994 | Miller et al. ............... 385/1 |
| 6,031,948 | A | * | 2/2000 | Chen ....................... 385/24 |
| 6,271,959 | B1 | | 8/2001 | Kim et al. |
| 6,289,151 | B1 | * | 9/2001 | Kazarinov et al. ........... 385/32 |
| 6,389,203 | B1 | * | 5/2002 | Jordan et al. ............... 385/50 |
| 6,546,164 | B1 | * | 4/2003 | Chen ....................... 385/24 |
| 6,563,971 | B1 | * | 5/2003 | Burton et al. .............. 385/15 |
| 6,760,521 | B2 | * | 7/2004 | Watanabe .................. 385/50 |
| 6,766,083 | B2 | * | 7/2004 | Bona et al. ................ 385/40 |
| 6,836,599 | B2 | * | 12/2004 | Gonthier ................... 385/43 |

(Continued)

FOREIGN PATENT DOCUMENTS

EP 1 335 510 A1 8/2003

*Primary Examiner*—Frank G Font
*Assistant Examiner*—Ryan Lepisto
(74) *Attorney, Agent, or Firm*—Robert Brouillette; Brouillette & Partners LLP

(57) ABSTRACT

An all-fiber, phase controlled interferometer device is disclosed as well as its method of manufacture. This device is suitable for use in an optical DPSK demodulation system. It is comprised of two optical fiber couplers, each having two input and two output ports and two branches between the couplers of unequal length. The couplers have a splicing ratio of 50% over the wavelength operating range of the device. The two branches between the couplers are shaped to provide one bit of delay between the branches and are also shaped to make a compact device. Also, the two branches are formed in such a manner as to minimize birefringence in the device. In addition, a fiber heater is provided to heat the longer branch so as to obtain phase control of the interferometer. The method of producing such a device is also disclosed.

17 Claims, 13 Drawing Sheets

U.S. PATENT DOCUMENTS

| | | | |
|---|---|---|---|
| 6,847,759 B2 * | 1/2005 | Shibata | 385/27 |
| 6,975,781 B2 * | 12/2005 | Takiguchi et al. | 385/3 |
| 7,016,615 B1 * | 3/2006 | Lenz et al. | 398/193 |
| 7,171,076 B2 * | 1/2007 | Shibata | 385/32 |
| 2003/0048991 A1 * | 3/2003 | Gonthier | 385/43 |

* cited by examiner

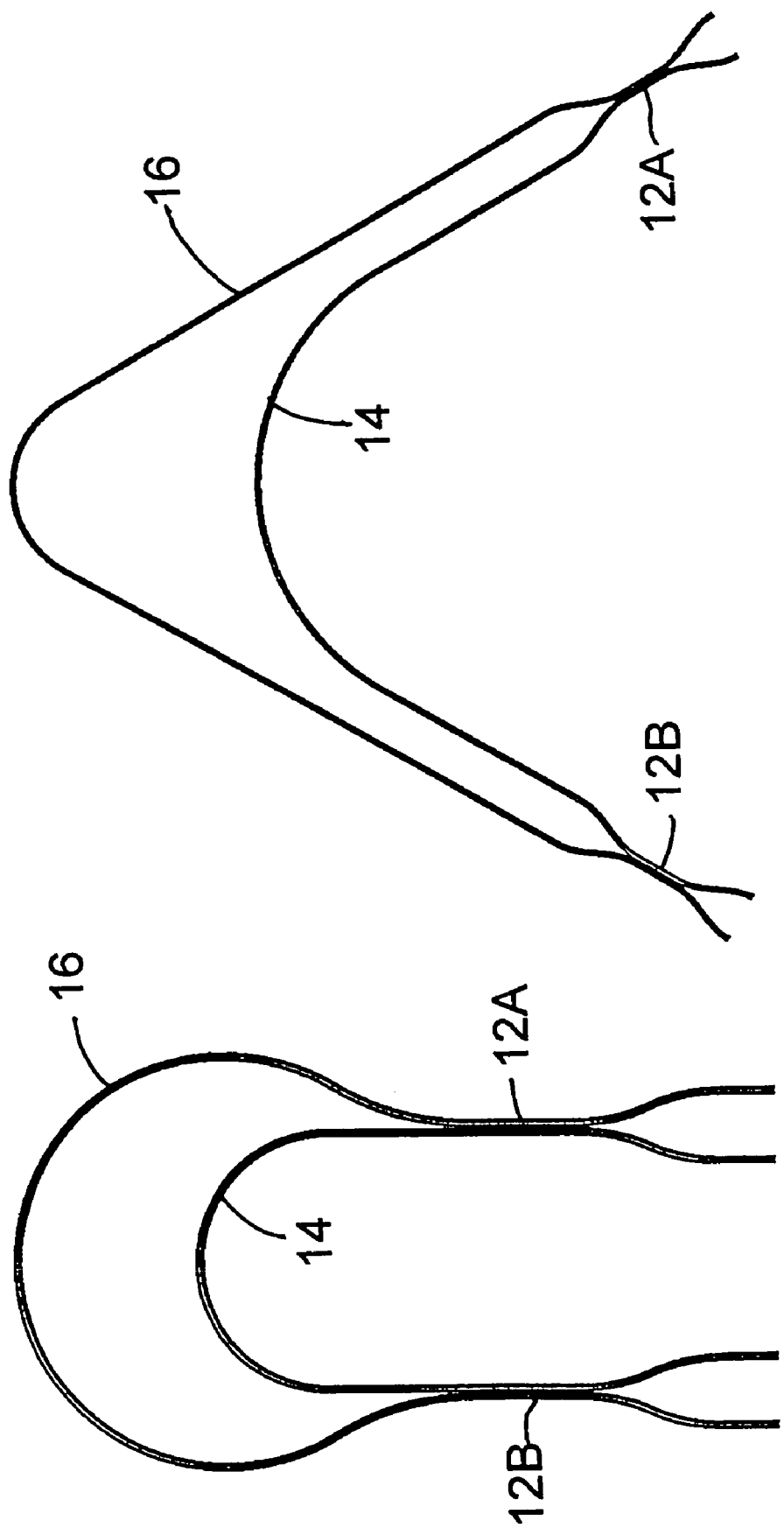

ALL-FIBER PHASE CONTROLLED DELAY INTERFEROMETER AND METHOD OF MAKING THE SAME

FIELD OF THE INVENTION

The present invention relates to the field of optical communication signal demodulation and more particularly to the field of optical fiber delay interferometers. More specifically, the present invention is directed to providing an all-fiber low loss and low birefringence phase controlled delay interferometer device particularly suitable for optical DPSK demodulation applications, and which may be formed into a compact shape.

BACKGROUND OF THE INVENTION

Although most optical communication systems today use binary On-Off Keying (OOK), differential phase shift keying (DPSK) has been demonstrated experimentally as a very attractive alternative to OOK for long haul optical communications. In long haul optical communication systems, for a given bit-error ratio (BER), binary DPSK requires nearly 3 dB lower optical signal-to-noise ratio (OSNR) than OOK, enabling extended reach. Differential quadrature-phase-shift keying (DQPSK) offers all the advantages of multilevel encoding which increases spectral efficiency, improved tolerance to chromatic dispersion (CD) and polarization-mode dispersion (PMD), and relaxed components bandwidth requirements without incurring a power penalty with respect to OOK.

There are basically three modulation formats in a telecommunication system, which are On-Off keying (OOK), Frequency Shift Keying (FSK) and Phase Shift Keying (PSK). On-Off keying (OOK) is using the signal to modulate the amplitude of a carrier wave laser, while the Frequency Shift Keying (FSK) or the Phase Shift Keying (PSK) is using the signal to modulate either the frequency or the phase of a carrier wave laser instead of modulating the amplitude that is the OOK scheme. Both FSK and PSK systems depend on highly frequency-stabled carrier wave laser and local oscillator laser with frequency, phase and polarization matched with the carrier wave laser to get the information.

DPSK system is slightly modified PSK system. The term 'differential' means that the information is encoded into the bit-to-bit phase change rather than into an absolute phase value. This avoids both the frequency or phase ambiguity inherent to a FSK or PSK system and the necessity of very stable local oscillator laser and carrier wave laser. Due to the lack of an absolute phase reference in direct-detection receiver, the phase of the preceding bit is used as a relative phase reference for demodulation.

However, DPSK and DQPSK modulation formats require a delay interferometer for demodulation at the receiver. This device converts the phase-coded information into detectable intensity information relying on the phase difference between adjacent bits. Realizations of the delay interferometer typically include integrated planar waveguide and fiber-based interferometers. The path-length difference of the delay interferometer can be fine-tuned for phase control using either an integrated thermal heater or a piezoelectric transducer. Birefringence in the fibers must also be very low, because in the presence of birefringence, perfect centering of the interferometer cannot be achieved simultaneously for both polarizations, resulting in system penalties.

A delay interferometer, such as Mach-Zehnder interferometer, comprises one splitter in series with a combiner, the two optical paths between the splitter and the combiner being of different lengths that provide a well-defined delay for two optical signals corresponding to the duration of a bit signal. At the output side of the delay interferometer the two signals are detected by a balanced receiver in order to extract information from the received DPSK encoded optical signals. It is very important that the delay for two optical signals be independent of the state of polarization of the two optical signals.

In U.S. Pat. No. 6,271,959 there is disclosed an optical frequency demodulation technique for extracting overhead signal from an optical channel carrying both payload and overhead signals. The technique makes use of asymmetrical Mach-Zehnder interferometry (AMZI) in an optical frequency demodulator to extract the overhead signal information. The optical frequency demodulator is composed of a tuned asymmetric Mach-Zehnder interferometer for extracting the overhead signal by frequency discrimination, a balanced receiver pair for converting the overhead signal into an electrical signal and a low-pass filter for eliminating high frequency components from recovered overhead signal information. There is no indication, however, in this patent that a similar technique could be used to demodulate DPSK signal.

In European Patent Application No. EP 1 335 510 A1 there is disclosed a delay-line interferometer based on single-mode fibers. The device is composed of two beam splitters and well-defined equal total bending angle optical paths between the two splitters to ensure equal polarization in both optical paths.

The bending of optical fiber will introduce birefringence in the fiber because of the elasto-optic effect. It is difficult to keep the total bending angle equal for both optical paths between the two splitters, especially if one tries to reduce the size of the device. The other problems associated with the delay-line interferometer of EP 1 335 510 A1 are reliability of the bended optical fibers and the ability of tuning the optical channel center with the laser frequency when environment temperature changes occur.

In yet another prior art U.S. Pat. No. 6,563,971 there is disclosed an optical fiber Mach-Zehnder interferometer employing miniature bends. The device is made of two couplers with tapered optical paths miniature bends in between in order to reduce the size of an optical fiber Mach-Zehnder interferometer. One major problem associated with the tapered miniature bends is the large birefringence that prevents this technique to be used in the delay interferometer for DPSK demodulation application. The other problem with this technique is the inability to coat the fiber with a metal film in the tapered bend region because of induced high losses.

Therefore, there is a need for an optical delay interferometer with low-loss, low birefringence, fast phase-tuning capability, able to work in wide spectral range, as well as being highly reliable and preferably of small size.

SUMMARY OF THE INVENTION

Though based on the well-known Mach-Zehnder structure, the present invention consists of a novel combination of several features that enable improved performance of the device. The Mach-Zehnder structure is composed of two optical fiber couplers each having two input and two output ports. The couplers are concatenated in series, forming a two-branch interferometer. The lengths of the two branches are unequal, thus providing a delay between the optical paths. Pulses at the input of the interferometer are split into two halves, one half pulse being delayed by one bit so as to interfere in the output coupler with the next bit half pulse coming from the other branch. In order to have high contrast in the interference, it is necessary that the two couplers have a splitting ratio close to 50% over the wavelength operating range of the device, and second, that the optical delay experience by the two half pulses be the same, irrespective of their state of polarization, by forming an interferometric structure that has minimal birefringence. The present invention thereby provides a low-loss and low-birefringence phase-controlled delay interferometer that is suitable for use in an optical DPSK demodulation system, and which may be made in a compact shape.

Because of the different fiber lengths, the fibers inside the interferometer must be bent. In order to provide a compact size, one embodiment of this invention proposes to shape the two interferometer fiber branches in the form of a U, thus making the two couplers parallel. Preferably, the U-shaped fibers are placed in a mechanical jig that precisely defines the optical path difference, by adjusting the distance between the two U-shaped branches. Also, a low birefringence fiber is selected in order to minimize the birefringence in the bent fibers.

Yet another aspect of this invention is to preferably fabricate the two couplers on the same fabrication station so as not to move the optical structure during the fabrication step and the bonding step. Also, it is preferred to use a micro-torch held at an angle with respect to the plane defined by the two couplers so as to be able to heat one coupler without heating the other, that angle being preferably greater than 45°.

A still further embodiment of this invention is to tune the contrast of the interferometer by fabricating the second coupler directly on the interferometer structure and monitoring the contrast live during fabrication.

Yet another aspect of this invention is to provide wavelength independent couplers so as to increase the operational wavelength range of the interferometer Furthermore, another aspect of this invention is to thermally shape the optical fibers into a bent position by annealing their internal stresses while they are being maintained in a bent shape. This reduces birefringence in the fibers bends and birefringence at the emergence of the fibers from the bond points, where bending can produce a stress concentration. Alternatively, one may reduce the diameter of the bent fibers to reduce stresses, such reduction being achieved by etching the fibers. As a further alternative or in addition to the above procedures, one may select a low birefringence fiber of a smaller than regular diameter, to reduce bending stress. These reduced diameter fibers may also be used to reduce the bend radius of the fiber shape.

A still further aspect of this invention is to provide phase control of the interferometer by providing a fiber heater on at least one of the branches between the couplers.

Such fiber heater may be placed on the longest arm of the interferometer to compensate the natural temperature dependence of the interferometer by heating the fiber. One may produce such fiber heater by uniformly coating the fiber with a metal film offering a nominal resistance to current flow and which acts as an efficient, low-birefringence heater. The electrical connection to the fiber heater may be made by a low stress soldering process or by soldering a micro-wire, or by wire bonding to the fiber heater.

The fiber heater may also be formed by bonding a micro-wire heating element to one of the branches or by coiling a micro-wire heating element around the fiber of one of the arms of the interferometer. Moreover, the fiber heater may be incorporated in the substrate close to the fiber.

A further aspect of this invention is to bond the complete interferometer structure on a single substrate. It is preferable to use hard bond points to hold the couplers to the substrate in order to minimize creep that could lead to deterioration of the coupling ratio. One may shape the coupler bond points by molding them while limiting their area or controlling their shape using the natural capillarity of the adhesive, thereby reducing induced birefringence by virtue of the reduction of stress and equalization of the remaining stress on both fibers. Soft bond points are preferable to hold the interferometer branches or arms, so as not to cause unnecessary stress-induced birefringence. Furthermore, one should space the soft bond points supporting the suspended arms of the interferometer at a distance that prevents fiber vibration to resonate below a predetermined limit. One the other hand, one should minimize the bond points on the fiber heater section so as not to reduce the heater efficiency. Moreover, the non-heated fiber may be completely sealed in the soft bond material to reduce heating through convection or radiation.

Yet another aspect of this invention is to provide other path shapes than a U-shape to reduce even more the size or for other design purposes, particularly for long delay interferometers.

Another aspect of the invention is to provide equalization of the output fibers that carry the signal from the output coupler of the interferometer to optical detectors, whereby the demodulated bits at the output are synchronized at the balanced detectors. The termination of these fibers can take the form of cleaved ends or connectorized ends, but should be produced so as to achieve a time of flight separation from the interferometer output to the detectors substantially smaller than the delay provided by the interferometer itself (<2%).

According to the present invention, one can thus obtain an interferometer structure for DQPSK demodulation or a structure for multi-rate DPSK demodulation.

In essence, therefore, the present invention provides an all-fiber, phase controlled delay interferometer device suitable for use in an optical DPSK demodulation system which comprises:

(a) two optical fiber couplers, each having two input and two output ports, which couplers are concatenated in series to form a two-branch interferometer, and have a splitting ratio close to 50% over the wavelength operating range of the device;

(b) the two branches between the couplers are of unequal length and are shaped to a predetermined shape adapted to provide one bit of delay between the branches when pulses at the input of the interferometer are split into two halves, whereby one half pulse is delayed by one bit so as to interfere in the output coupler with the next bit half pulse coming from the second branch;

(c) means for making the delay between the two half-pulses insensitive to polarization, by producing an interferometric structure with minimal birefringence; and (d) a fiber heater for heating at least one of the branches between the couplers so as to obtain phase control of the interferometer.

The invention also provides a method of making an all-fiber, phase controlled delay interferometer device suitable for use in an optical DPSK demodulation system, which comprises:

(a) fabricating two optical fiber couplers each having two input and two output ports, which couplers have a splitting ratio close to 50% over the wavelength operating range of the device;

(b) concatenating the two couplers in series so as to form a two-branch interferometer in which the two branches are of unequal length, thus providing a delay between the optical paths;

(c) forming the two branches so as to produce an interferometric structure with minimal birefringence; and (d) providing a fiber heater for heating at least one of the branches so as to obtain phase control of the interferometer.

Further aspects and features of the present invention will become apparent to those of ordinary skill in the art upon reading the following description of specific embodiments of the invention in conjunction with the accompanying drawings.

BRIEF DESCRIPTION OF THE DRAWINGS

The present invention will now be described with reference to the appended drawings in which:

FIGS. 10A to 10H illustrate various shapes of the delay interferometer of the present invention;

DETAILED DESCRIPTION OF THE PREFERRED EMBODIMENTS

Figure 1:
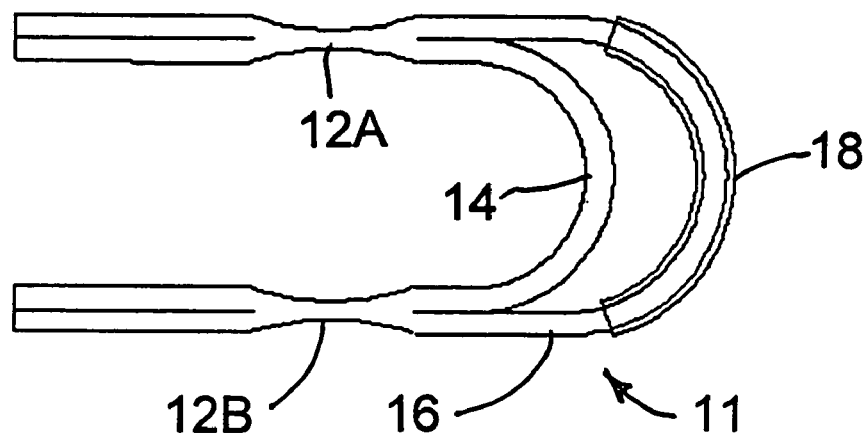
FIG. 1 is a plan view showing an all fiber compact low birefringence phase controlled delay interferometer in accordance with one embodiment of the present invention.

Embodiments of the present invention will be described below in greater detail by way of example with reference to the appended drawings. It should be kept in mind that the described embodiments are only presented by way of example and should not be constructed as limiting the inventive concept to any particular physical configuration. In the drawings, the same reference numbers are used to designate the same features.

The structure of an all-fiber compact, phase controlled delay interferometer of the present invention is shown in FIG. 1, which uses a similar U-shaped configuration as already illustrated in FIG. 4A of U.S. Pat. No. 6,836,599 which belongs to the same assignee as the present application. The all-fiber phase controlled delay interferometer 11 includes two 3 dB wavelength insensitive couplers 12A and 12B connected by two unequal lengths of thermally bent or acid-etched U-shaped optical fibers 14 and 16 adapted to provide one-bit of delay. One of the two unequal lengths of the U-shaped optical fibers is coated with a metal thin film 18 in order to provide the phase-control capability.

One way to reduce the size of a delay interferometer is to bend the interfering arms into a U-shape. However, bending of optical fiber will introduce several problems such as loss, birefringence and decreased fiber reliability. In a single mode fiber such as SMF 28, the bend loss is strongly dependent on the bend radius and refractive index difference between the core and the cladding of a fiber. For a given refractive index difference of a single mode fiber there is a limit for the bending radius that could be used to bend the interfering arms into a U-shape without introducing significant loss. The other problem associated with bending of optical fiber is the birefringence. Birefringence in single mode fibers is known to result either from deviations of the core geometry from the ideal straight circular cylinder or from mechanical stress through the elasto-optic effect. The bending-induced birefringence is essentially a stress effect. It results from the lateral compressive stress that builds up in a bent fiber with large deformation. The bending of an optical fiber also causes a reliability problem. The minimum bend radius of an optical fiber is typically limited by static fatigue stress corrosion that causes the fiber to fracture in time. In the compact device of the present invention, it was found possible to bend the U-shaped arms of the interferometer to a radius of 15 mm or less, typically between 12 mm and 15 mm.

The following operations, proposed as an embodiment within the scope of this invention, solve the birefringence and reliability problems associated with bending of optical fibers:
1. Select a low birefringence optical fiber;
2. Form the fiber into a U-shape by bending the fiber in a fixture that holds the fiber in two parallel grooves while leaving the bent section exposed;
3. Anneal the U-shape optical fiber with a flame torch or $CO_2$ laser in order to release the stress inside the optical fiber.

Figure 2:
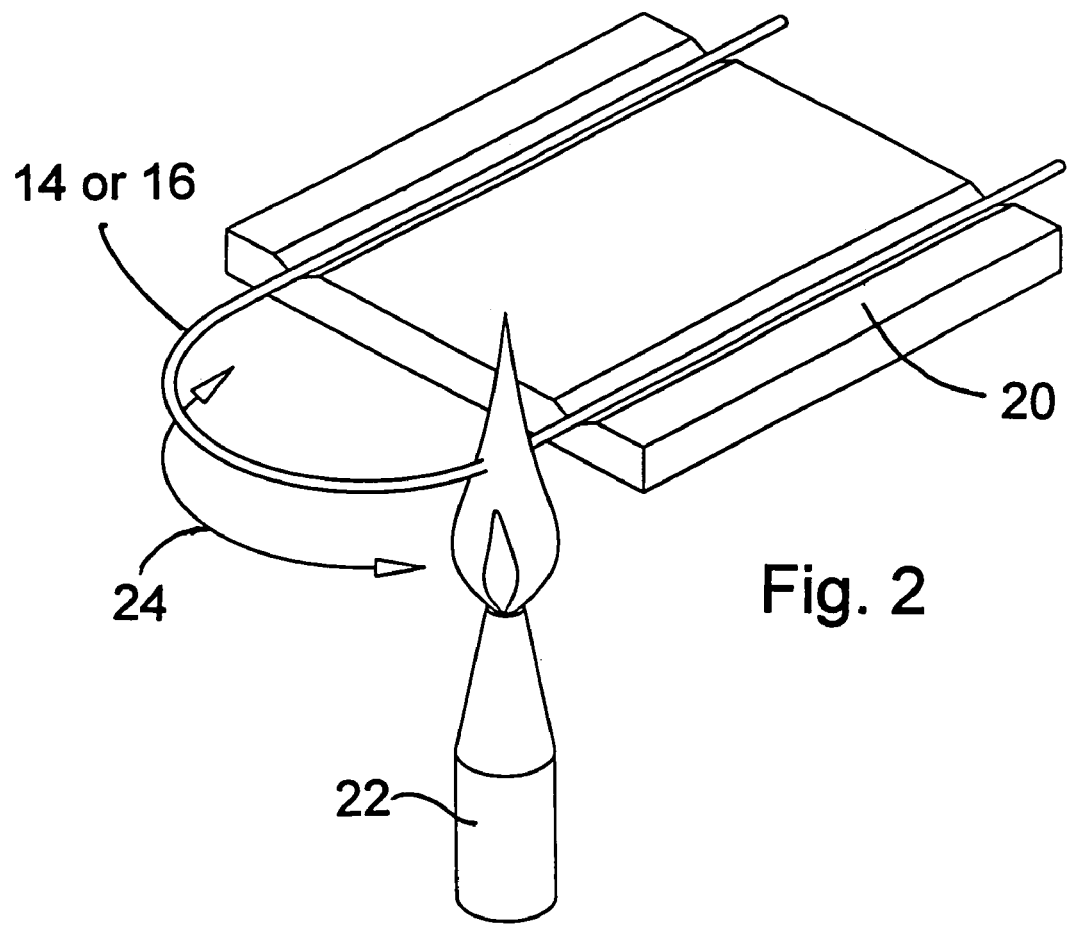
FIG. 2 is a perspective view showing how to bend an optical fiber using a flame torch in order to release the stress in a U-shape curved optical fiber.

FIG. 2 shows how to bend an optical fiber using a flame torch in order to release the stress in a U-shape curved optical fiber. A low birefringence optical fiber 14 or 16 is first stripped of plastic protective jacket. Then it is put in a v-grooved fixture 20 that produces a U-shape of a predetermined radius. A flame torch 22 is moved as shown by arrow 24 to heat the optical fiber in bent region to its strain point temperature in order to release the stress inside the bent region. An alternative method is to use $CO_2$ laser as a heat source to release the stress.

Another way to release stresses and reduce the birefringence is to acid etch the fiber to locally reduce its dimension over the bent section.

For a proper operation of direct-detection of DPSK or DQPSK systems, it is essential to minimize the frequency offset between the optical source and the delay interferometer, since any such offset results in an imperfect interference within the delay interferometer and consequently in a receiver performance degradation. In a DPSK transmission system, the frequency offset can be induced by either a wavelength drift of the optical source or a polarization rotation of the signal, if the delay interferometer exhibits some polarization-dependent path-difference, resulting in a polarization-dependent shift of its transmission spectrum. Therefore, an active control loop is usually required to continuously adjust the phase of the delay-line interferometer.

Phase tuning in a delay interferometer 11 can be achieved by means of a thin-film micro-heater 18 placed on the surface of one arm of the interferometer and using the thermo-optic effect to alter the effective path-length difference. After an optical fiber has been U-shaped and de-stressed either thermally or by acid etching, a metal thin-film 18 is coated onto the surface of the bent region of the U-shaped fiber, as shown in FIG. 1, in order to provide the phase-control capability for the delay interferometer. The metal film should be thin, uniform and deposited under favourable process parameters (low deposition rate, low temperature, etc . . . ) such as to avoid the stress that may be induced by such metal thin-film itself which could increase the birefringence in the delay interferometer. Typically a three-layer film of Ti—Pt—Au is used, and the gold is etched away to reveal Pt and thereby to form the fiber heater. In some areas, Au is left behind to form solderable and wirebondable contacts.

Figure 3:
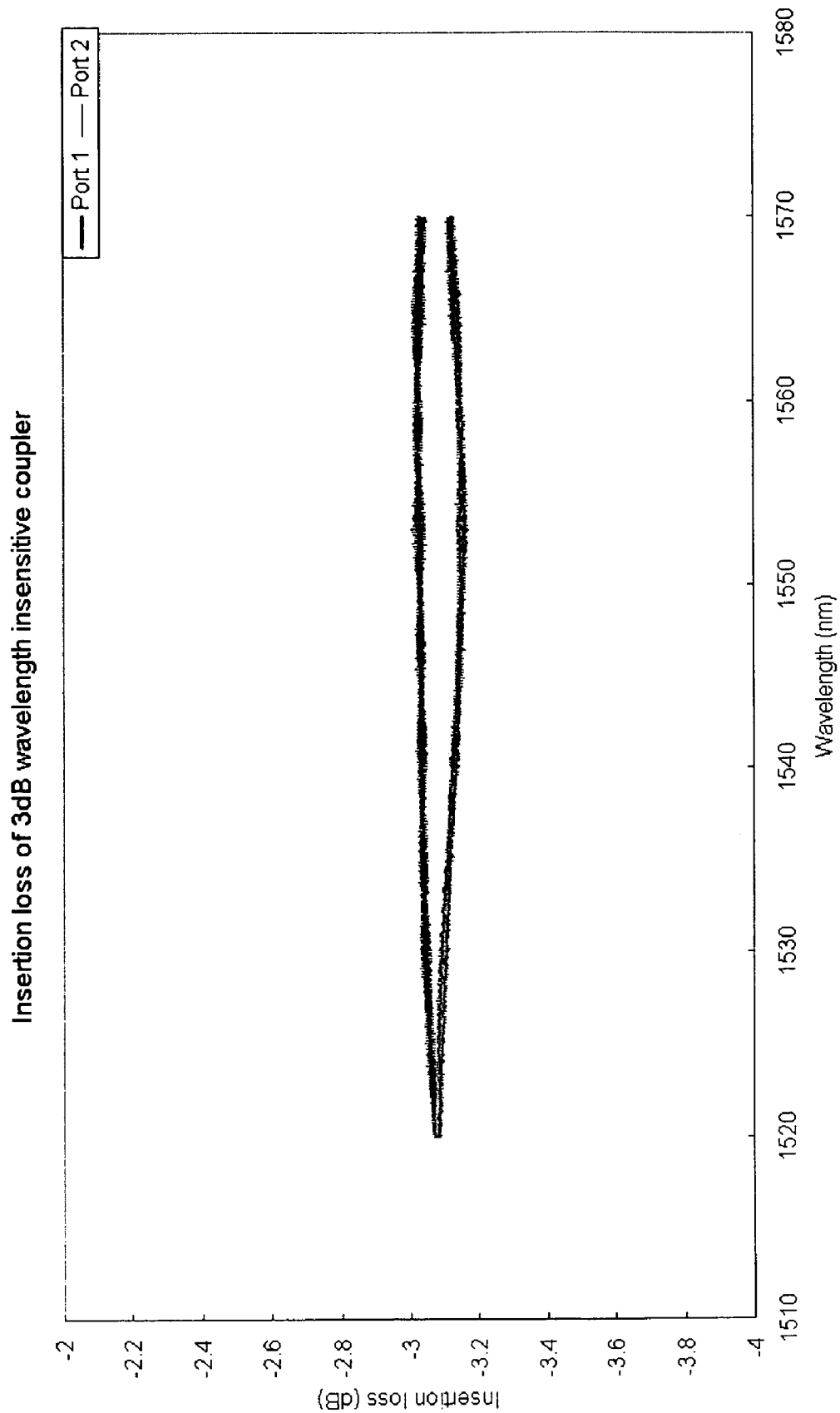
FIG. 3 shows the insertion loss versus wavelength for a 3 dB wavelength insensitive coupler.

In order to fully utilize the 35 nm bandwidth of an Er-doped amplifier, the delay interferometer has to be functioning within the 35 nm bandwidth. To achieve this performance, both couplers 12A and 12B in a delay interferometer 11 have to be maintained at 3 dB for at least 35 nm bandwidth, and this means that the two couplers must be wavelength insensitive. In order to make wavelength insensitive couplers, one of two U-shaped optical fibers 14 and 16 must be pre-tapered or etched on both sides of the U-shape region before making the two couplers. FIG. 3 shows the insertion loss versus wavelength for a typical 3 dB wavelength insensitive coupler used in a compact delay interferometer of the present invention.

Before making the wavelength-insensitive couplers 12A and 12B, both a coated bent fiber 18 and a non-coated bent fiber which has been pre-tapered over the are used to fabricate the couplers 14 are placed in a jig to adjust the optical path difference that corresponds to a one-bit of delay. Then both fibers on the side of coupler 12A are brought in side-by-side contact and are glued to a moving platform on the side of curved fiber region by forming a shape-controlled adhesive bond in order to make the coupler. After the coupler has been made, the second shape-controlled adhesive bond is formed on the other side of the coupler 12A. This process is repeated for coupler 12B. The adhesive bonds on the side of the curved fibers are required during that manufacturing step to avoid the difficult task of securing the non-collinear curved fiber, which would be hard to clamp. The means of forming them into well controlled shape are provided so as to control the birefringence in the delay interferometer.

Both wavelength-insensitive couplers 12A and 12B are made by conventional fused biconic taper technique with the aid of an optical spectrum analyzer in order to monitor the optical performance of the delay interferometer. Both couplers have to be as close to 3 dB as possible in order to give the best contrast between the two ports. In order to achieve the maximum contrast, the second coupler adjustment is also performed using a narrow linewidth swept wavelength laser that allows monitoring and maximization of the interferometer contrast during elongation of the second coupler.

Figure 4:
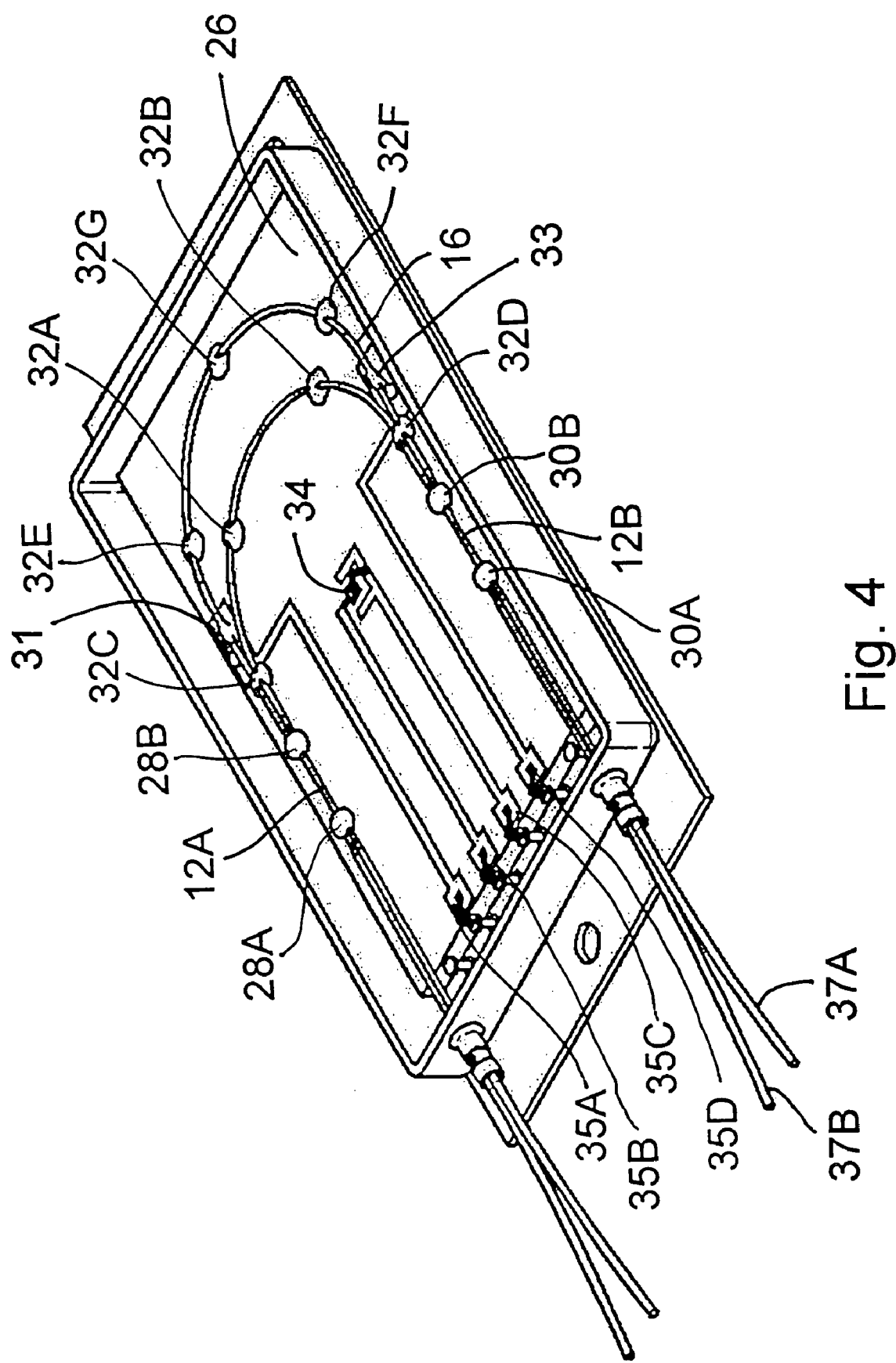
FIG. 4 shows a perspective view of a packaged all fiber compact low birefringence phase controlled delay interferometer of the present invention.

After the two couplers have been made, the delay interferometer structure is released from the coupler manufacturing station, and using a bonding apparatus, the couplers are re-tensioned and glued onto a single common silica substrate. This is done by applying a thin film of adhesive between the shape-controlled adhesive bonds and the substrate. After proper curing, the substrate is transferred into a low expansion metal case where it is bonded, the suspended arms of the interferometer encapsulated in discrete points and the electrical connections to the fiber heater performed. The case is then sealed in an inert atmosphere. This process yields an assembly as shown in FIG. 4 which illustrates, in an enlarged view, the installation of a compact delay interferometer of the present invention within a packaged DPSK, with the top open. The actual size of the device is about 4 cm×9 cm. In this setup, wavelength insensitive coupler 12A is anchored to the substrate 26, which normally is made of silica, by anchoring bonds 28A and 28B, and wavelength-insensitive coupler 12B is anchored to the substrate 26 by anchoring bonds 30A and 30B. The anchoring bonds are low stress adhesive bonds, which minimize the birefringence in the fibers of the interferometer. The U-shaped fibers 14 and 16 are also stabilized on the substrate 26 by encapsulating them at certain spots, for example by a silicone encapsulant. These spots are shown in FIG. 4 as 32A, 32B, 32C, 32D, 32E, 32F and 32G. These are self encapsulating spots adapted to provide microphonic vibration immunity.

Figure 11:
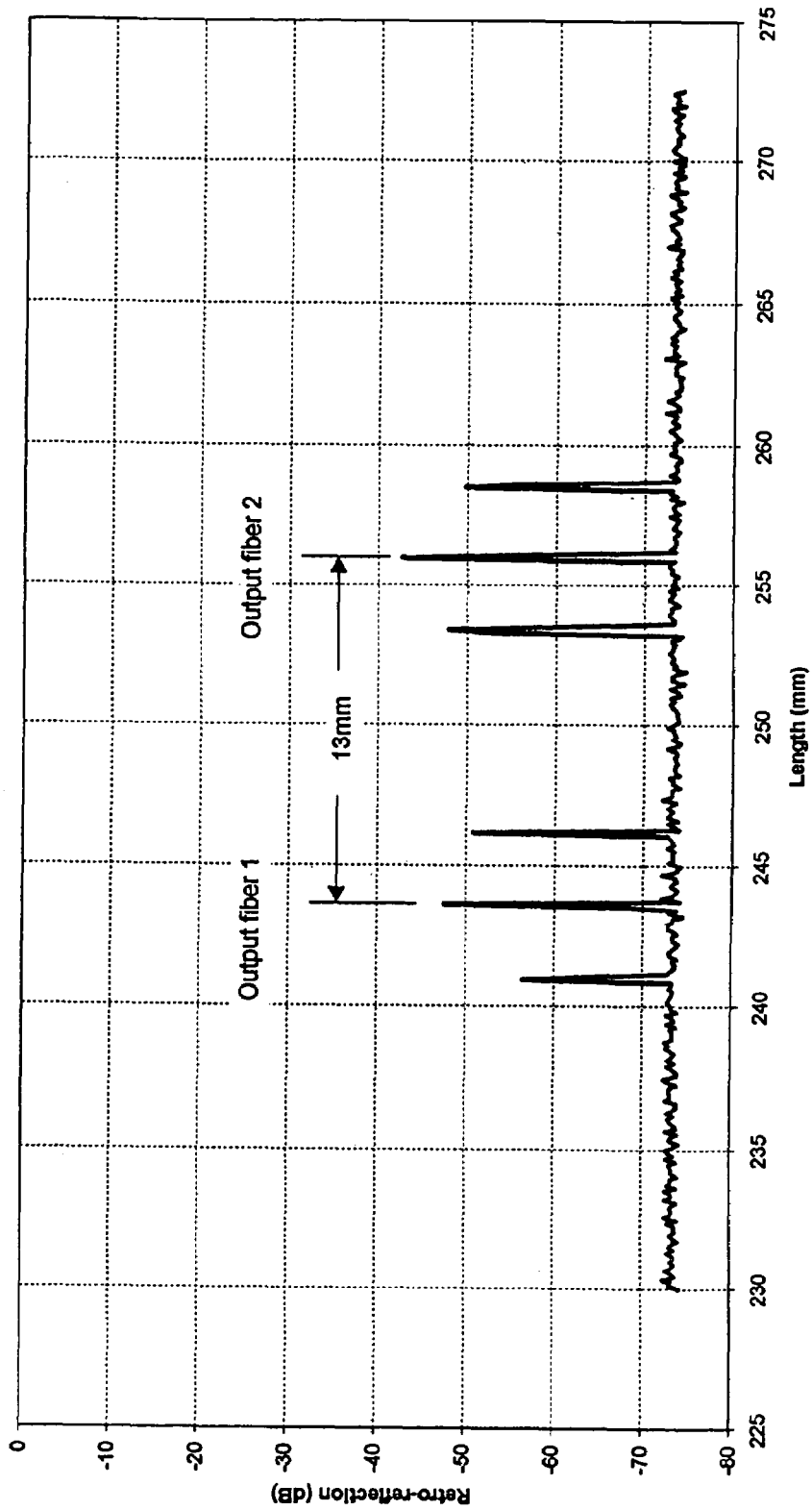
FIG. 11 shows a graph of retro-reflection versus length for white light interferometer high precision reflectometry measured through 40 GB/s delay interferometer.

In this arrangement, fiber 16 is metallized, for example with a Ti—Pt—Au coating, to provide phase control capability to the interferometer. Gold is removed by etching over a certain length of this coating to create a thin film fiber heater. Such fiber heater can compensate for 0° C.-65° C. ambient drift, with very low power consumption. Connections to the fiber heater are made through low stress soldered micro-wires 31 and 33 which complete the connection via substrate metallization tracks that are wirebonded to electrical connector pins 35A and 35D. A thermistor 34 connected to pins 35B and 35C is also provided to allow for measurement of the ambient or case temperature, which is required for control circuitry to properly drive the fiber heater. To provide equalization of the output fiber lengths 37A and 37B, cleaving can be used in conjunction with optical measurement to insure that the termination of these fibers are within 2% of the interferometer delay. To do this, one can either cleave the first fiber, then cleave the second fiber to a longer length than required and measure the length difference using white light interferometry. FIG. 11 illustrates the results of such an operation. The length difference is recorded from this measurement and the second fiber recleaved to shorten it by the required amount. Cleaving both fibers simultaneously in the same cleave tool, as if cleaving a fiber ribbon, is also feasible if the fibers are tensioned in a jig that insures they have the same geometrical length. The cleaved fibers can be mounted into a connector and polished while preserving length equalization. To achieve this, care must be taken when the fibers are mounted and glued inside the ferrule to insure that the cleaved tips protrude by equal amounts from the ferrules. This is easily achieved by mechanical reference means.

Figure 5:
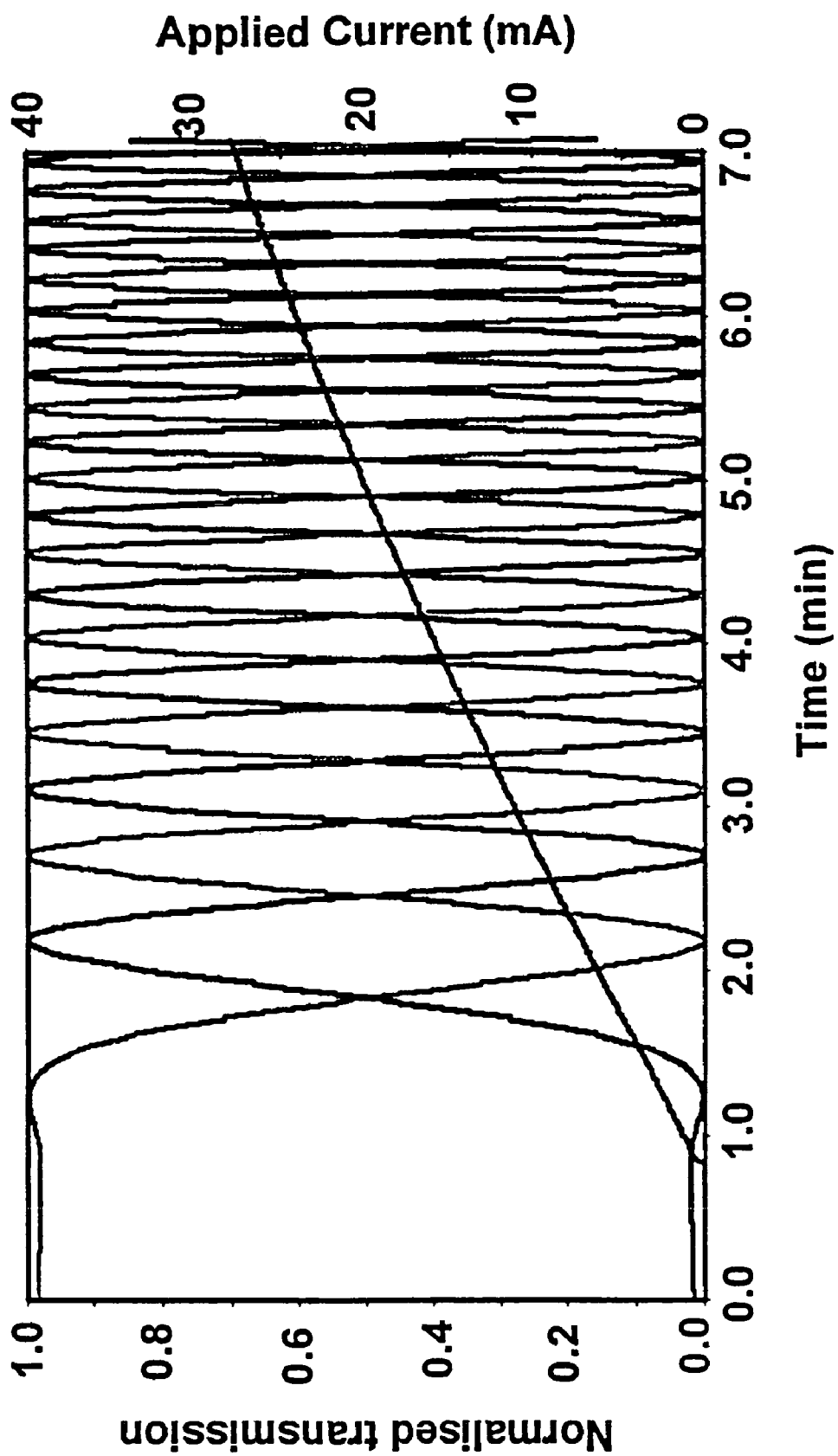
FIG. 5 shows a normalized transmission versus time in conjunction with the applied current used to heat one of the fibers to control the phase.

FIG. 5 shows a typical normalized transmission curves as a function of time in conjunction with the applied current shown as a straight line in the graph.

Figure 6:
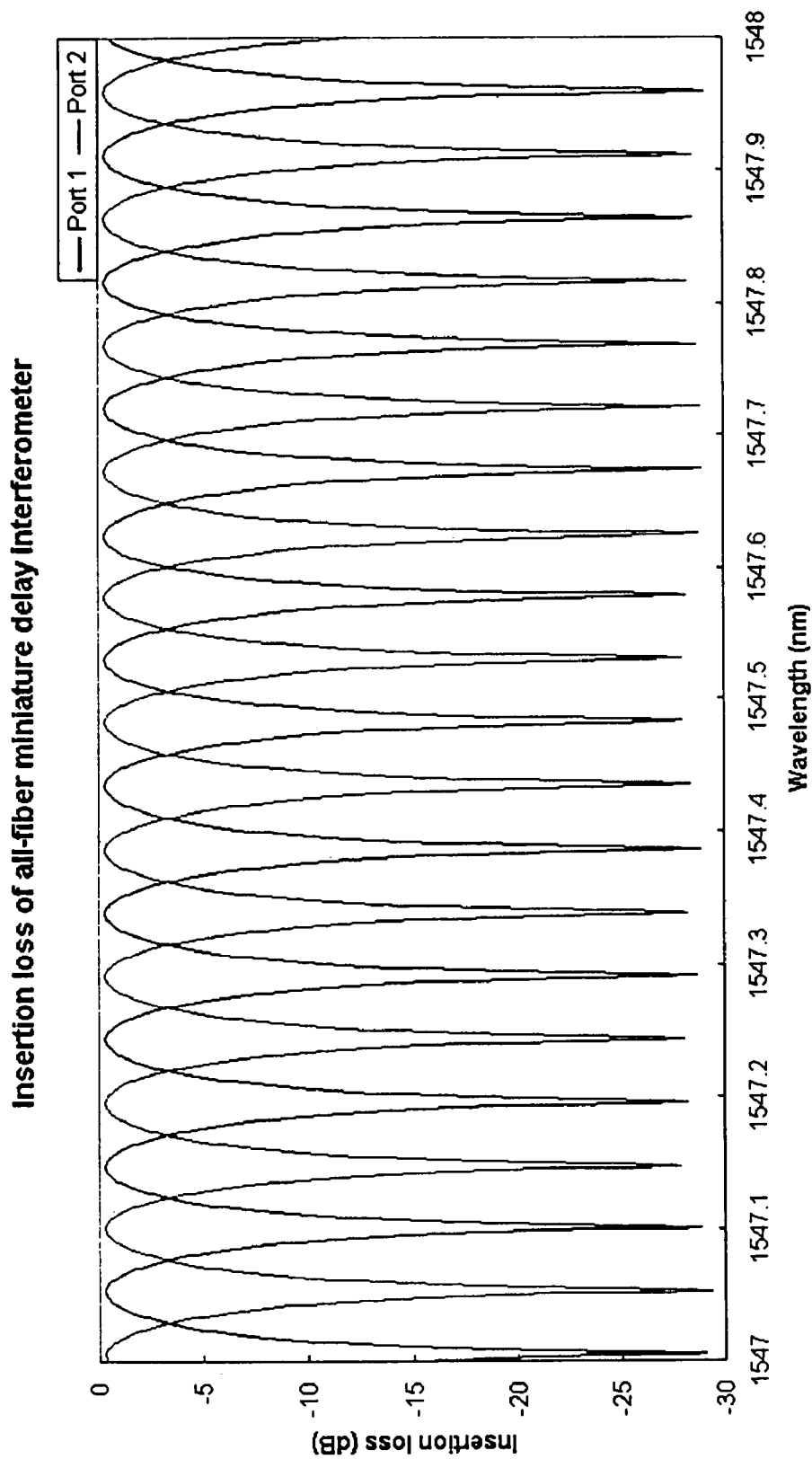
FIG. 6 shows the insertion loss of an all fiber compact low birefringence phase controlled delay interferometer of the present invention.

FIG. 6 shows the insertion loss of a typical all-fiber compact 10 GHz free-spectral range (FSR) delay-line interferometer such as described above in conjunction with FIG. 4.

Figure 7:
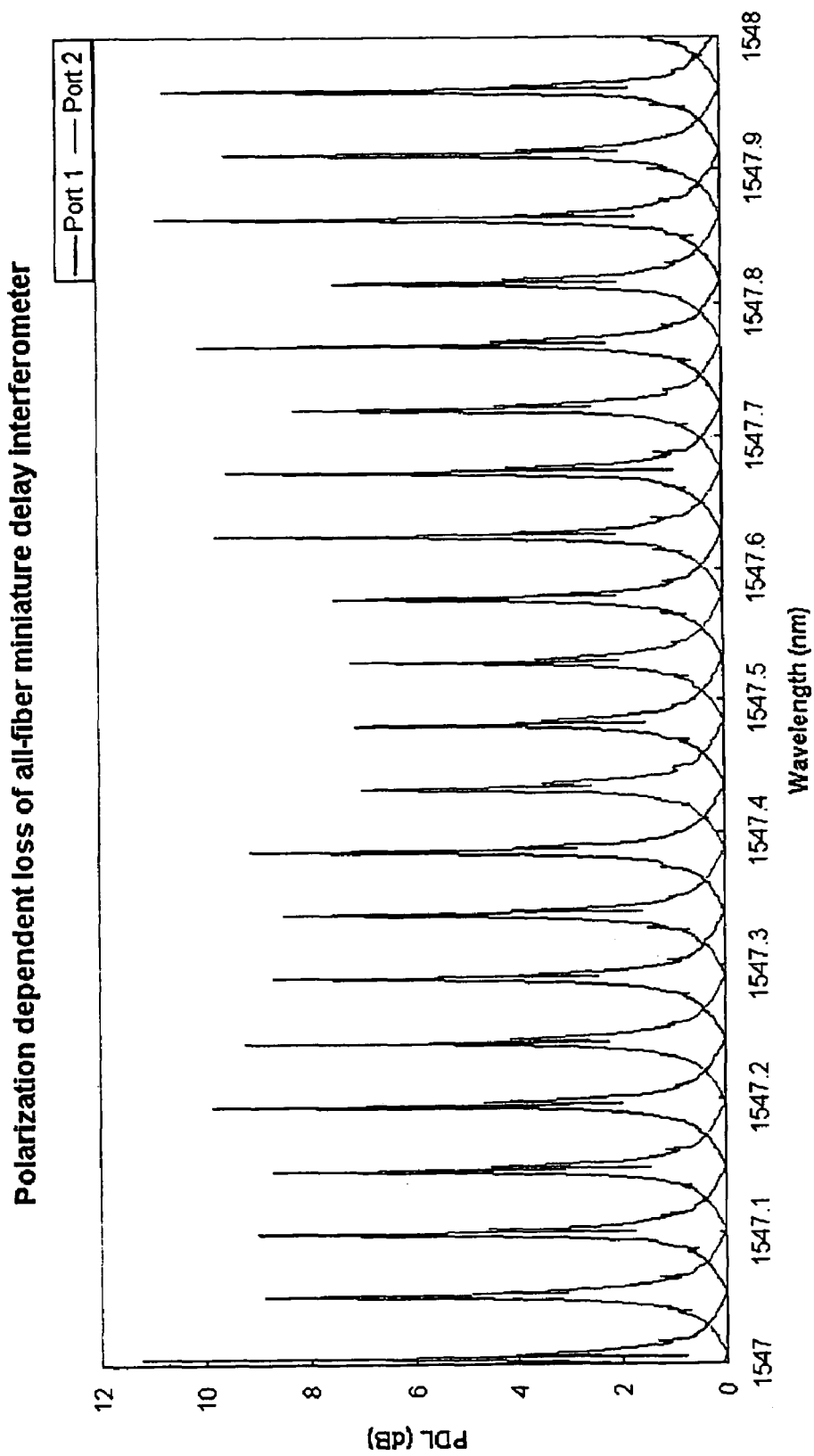
FIG. 7 shows the polarization dependent loss of an all fiber compact low birefringence phase controlled delay interferometer of the present invention.
Figure 8:
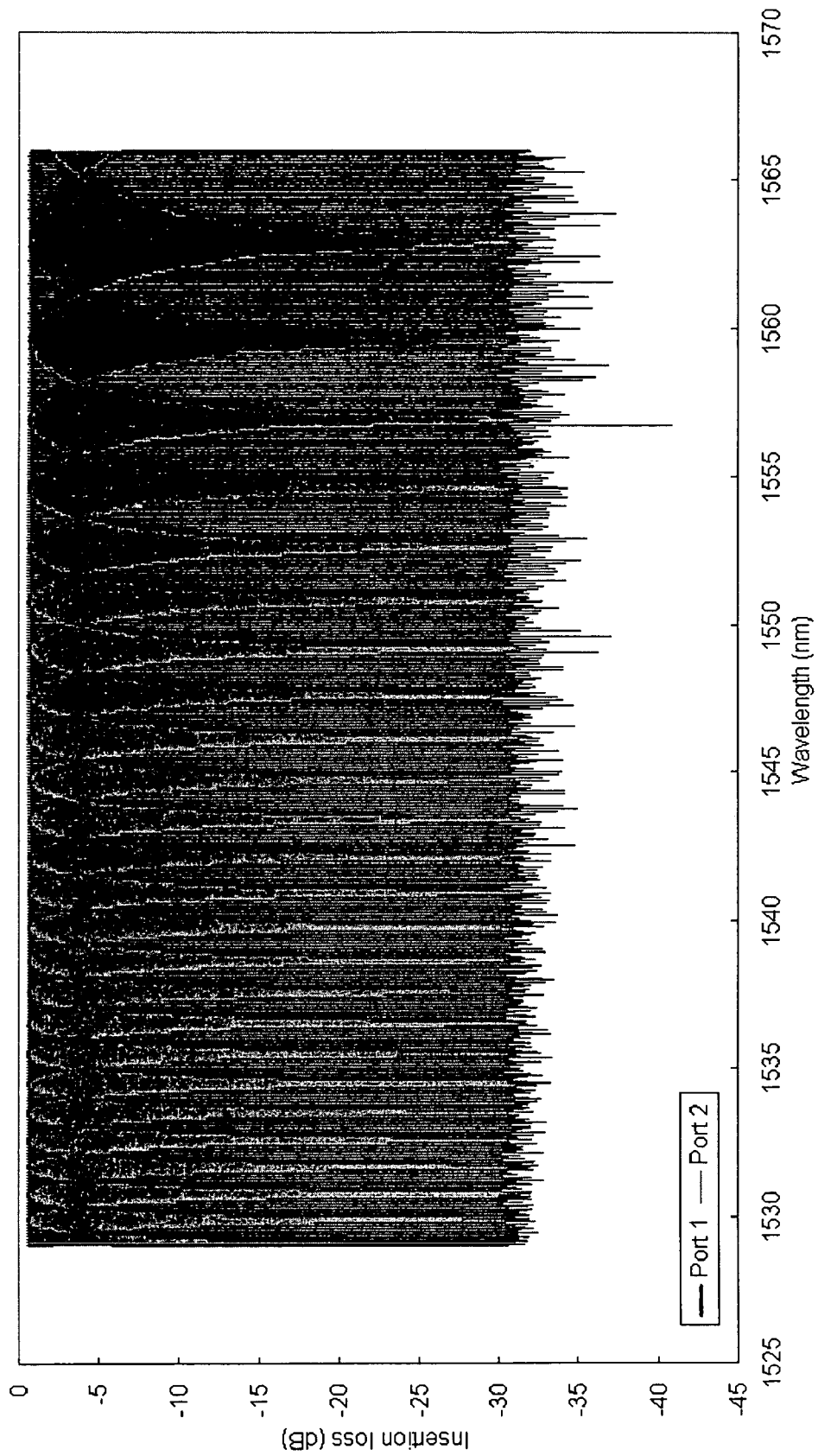
FIG. 8 shows the insertion loss of an all-fiber compact low birefringence phase controlled delay interferometer of the present invention for 37 nm spectral range.

FIG. 7 shows the polarization dependent loss of the same device, and FIG. 8 shows the insertion loss of such device for 37 nm spectral range.

Figure 9A:
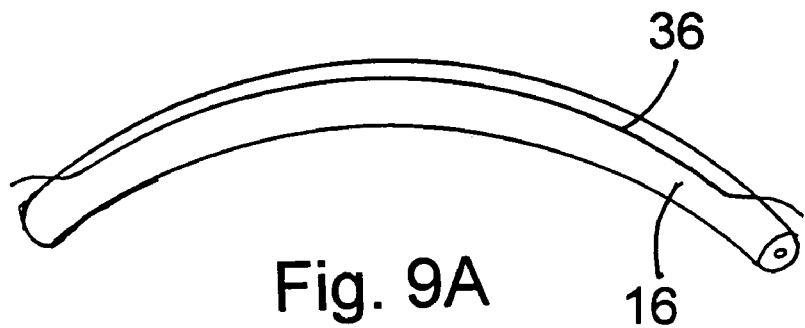
FIGS. 9A and 9B illustrate a fiber heater made of a micro-wire bonded to an arm of the delay interferometer either as a straight wire or a spiral wound around the fiber.
Figure 9B:
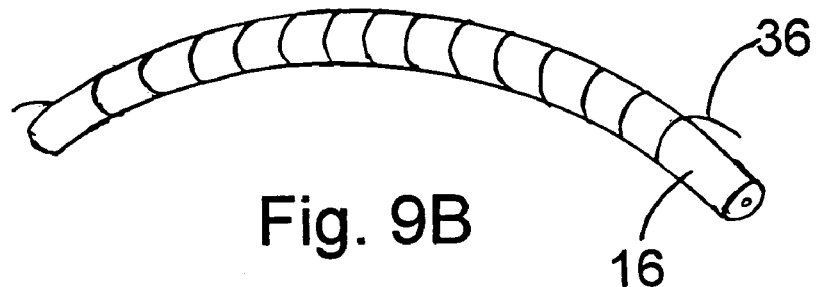
Figure 10A:
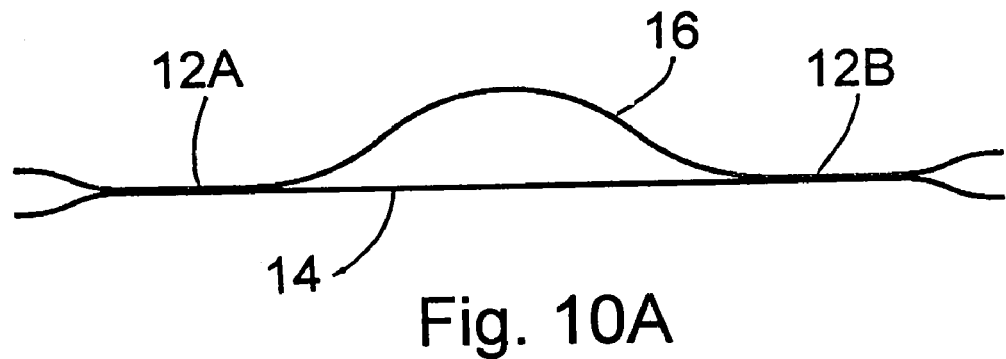
Figure 10B:
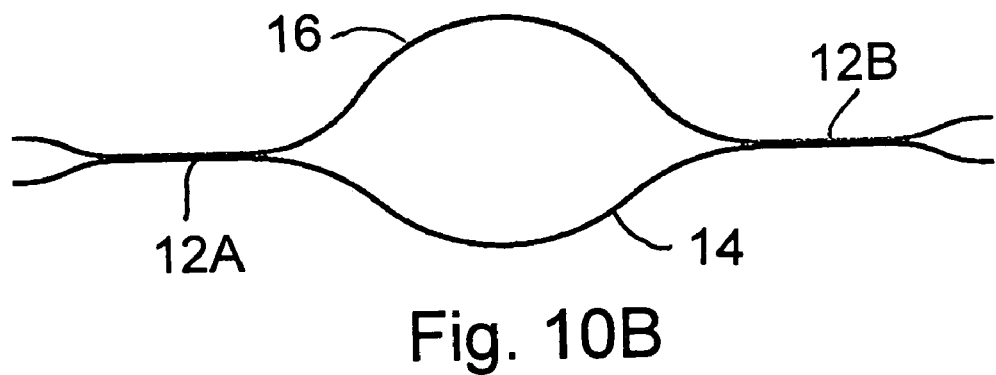
Figure 10F:
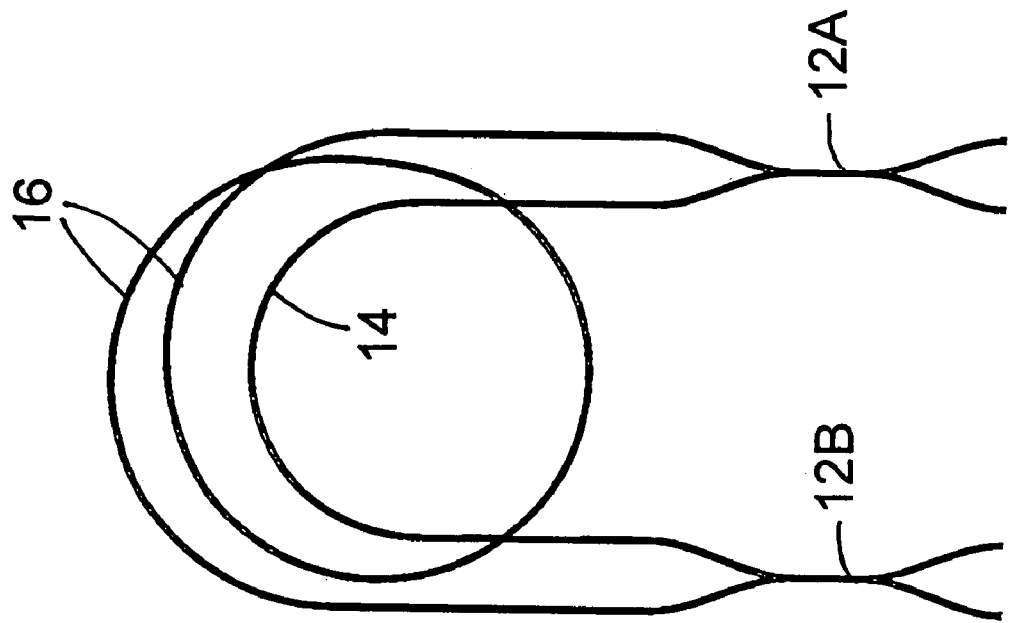
Figure 10E:
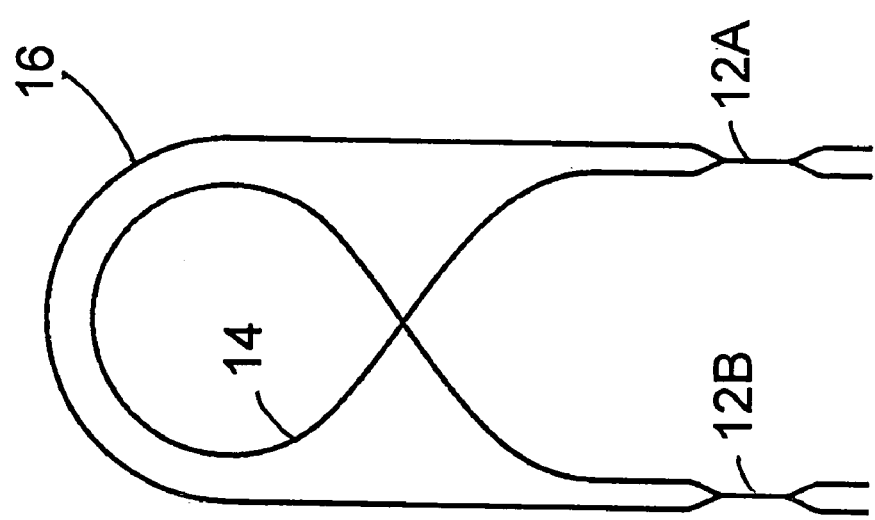
Figure 10G:
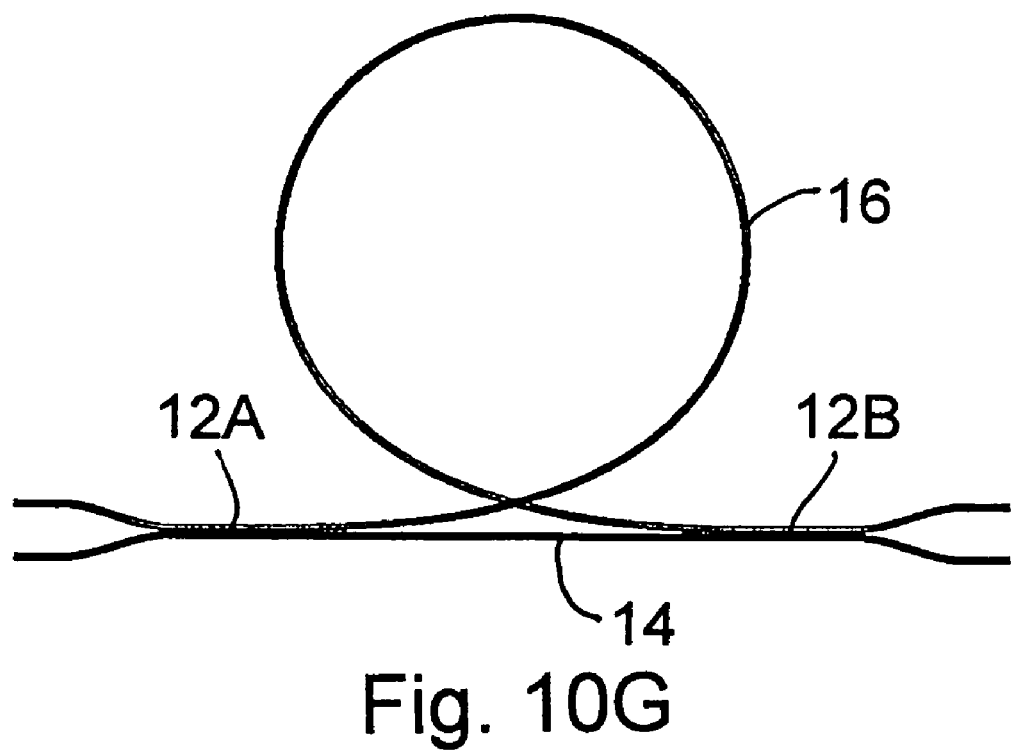
Figure 10H:
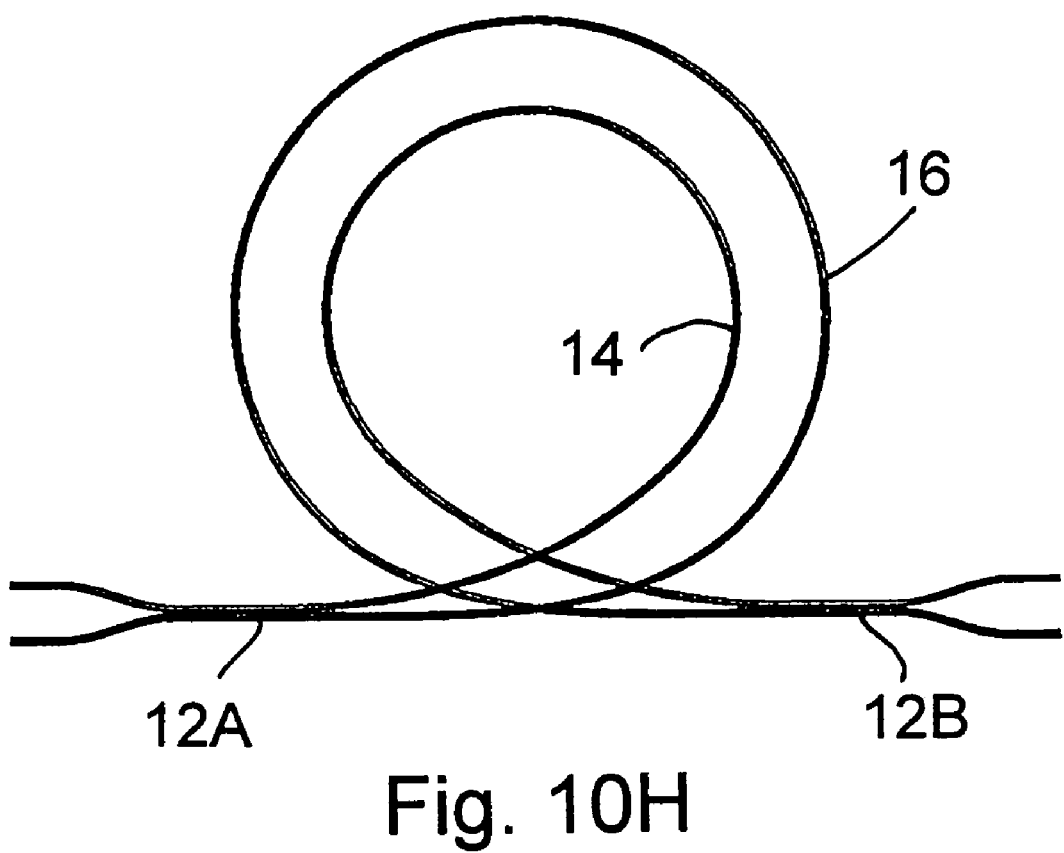

It should be noted that, as illustrated in FIGS. 9A and 9B, other means for heating fiber 16 may also be used, such as a micro-wire heater 36. In such a case, the heater may be added externally by providing a micro-wire along the curved fiber 16 as shown in FIG. 8A or by coiling such micro-wire around the fiber as shown in FIG. 8B. Such thin wire may be made, for example, of pure platinum or gold or titanium and an encapsulant is normally used to fix the wire to the fiber to insure a stable thermal contact. This operation may be performed before or after manufacturing the optical structure.

The heating is performed by connecting the fiber heater to a source of electric current and the electrical contact between the fiber heater. Since the heater is on the sensitive optical fiber, soft solders are preferred for this purpose, such as In/Sn 52/48 and other indium based solders, due to their low elastic limit which does not produce stress on the fiber that would increase birefringence. The electrical contact may also be achieved, for instance, using a gold wire one end of which is soldered to the fiber heater and the other to the source of electric current embedded in the substrate. This is particularly suitable because in this arrangement, the gold wire does not produce any mechanical resistance or stress and the quantity of solder required is greatly reduced, thus limiting stresses induced in the connection.

It should also be noted that the passive fiber 14 in this arrangement, namely the fiber which is not provided with the fiber heater, rather than being encapsulated at spots 32A and 32B on its curved trajectory, may be fully encapsulated over its entire length. This results in a better thermal isolation between the two fibers 14 and 16 as well as between these fibers and the ambient, thereby improving the efficiency and providing greater immunity against ambient temperature variations.

Although the delay interferometer described above is made with a U-shaped arms or branches 14 and 16 between the couplers 12A and 12B, other shapes may be used, particularly for long delay interferometers. Some such shapes are illustrated in FIGS. 10A to 10H. The arms of such interferometer may be formed as in the case of U-shaped arms by heating the curvature to de-stress the fibers, or by etching the fibers in the curved area with acid to reduce their diameters. Thus, the 125 μm diameter of an SMF 28 fiber may be reduced to 80 μm or even 50 μm in accordance with this invention, thereby minimizing stress and birefringence in the fibers. This reduction in diameter by etching also allows to make curves with reduced diameters and thus produce very compact devices.

The shaping of the fibers may be made in any suitable manner. For example, one may produce two halves of the structure of the interferometer and then splice them with one another before forming the desired shape. Moreover, a half wave plate, λ/2, may be inserted in each branch to limit the effects of birefringence, by directing the signals successively in perpendicular and parallel polarizations with reference to the substrate over points of stress.

Figure 12:
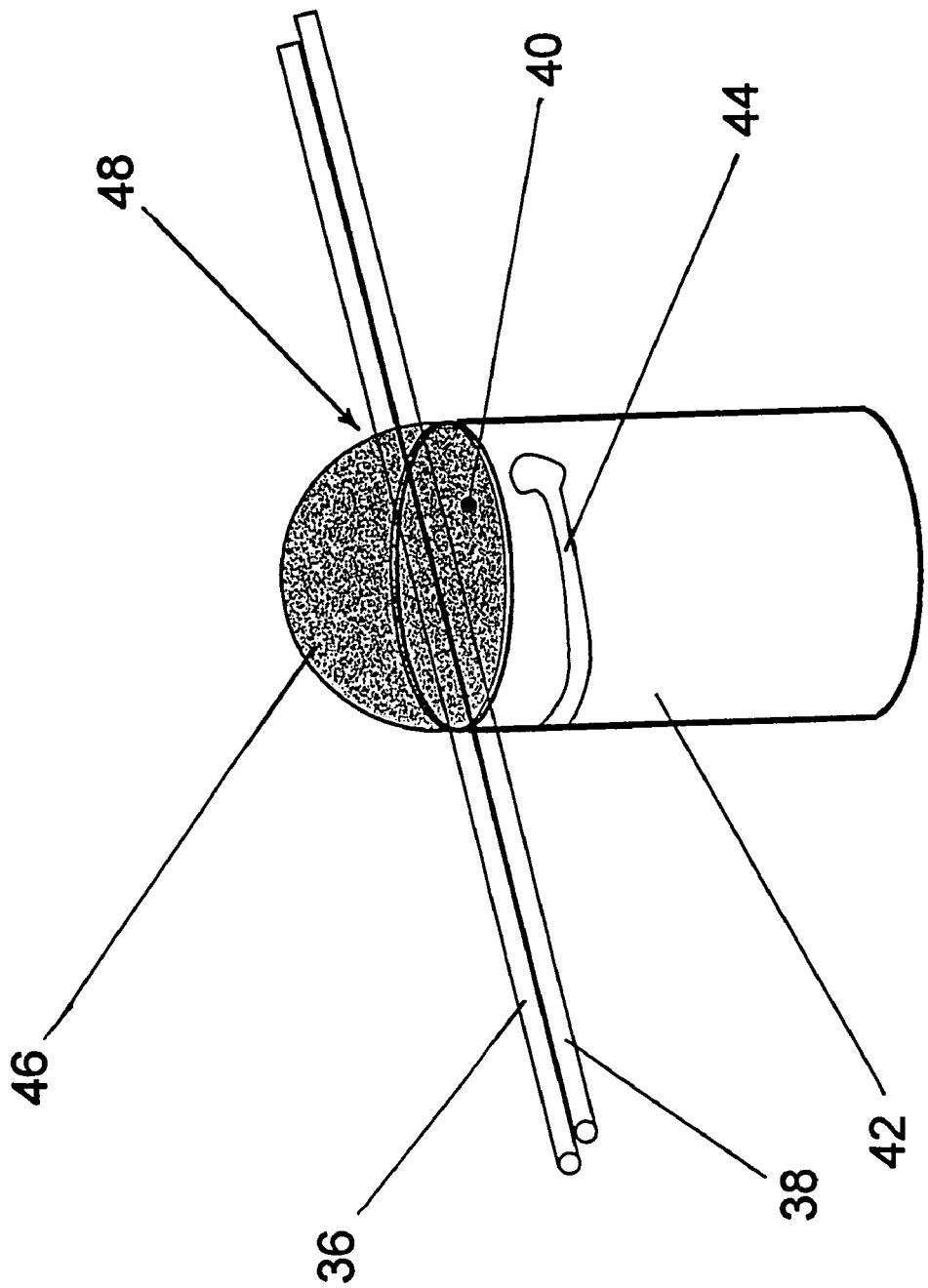
FIG. 12 shows a perspective view of a set-up for producing controlled bond points for the couplers.

It is also important to provide low stress bonding means for the couplers by controlling the shape and type of the bond adhesive. One way of doing this is illustrated in FIG. 12 which shows a pair of fibers 36, 38 placed over a forming surface 40 of a forming cylinder 42 having 1.25 mm OD and provided with a release mechanism 44 in the form of a built-in hinge. The forming surface 40 is polished flat. The UV curable adhesive 46 is applied onto the forming surface and the coupled fibers 36, 38 positioned thereon by using the natural capillary of the adhesive. Also, the tangent and centered emergence point 48 is controlled to obtain a low/symmetrical stress field. This procedure allows to mold the coupler bond points while limiting their area and controlling their shape, thereby reducing induced birefringence.

It should be understood that this invention is not limited to specifically described and illustrated embodiments, but may contain variations obvious to those skilled in the art, without departing from the invention and the scope of the following claims.

The invention claimed is:

1. An all-fiber phase controlled delay interferometer device configured for use in an optical Differential Phase Shift Keying (DPSK) demodulation system, which comprises:
   a) two optical fiber couplers, each having two input and two output ports, which couplers are concatenated in series to form a two-branch interferometer, and have a splitting ratio close to 50% over the wavelength operating range of the device;
   b) the two branches between the couplers are of unequal length and are shaped to a predetermined shape adapted to provide one bit of delay between the branches when pulses at the input of the interferometer are split into two halves, whereby one half pulse is delayed by one bit so as to interfere in the output coupler with the next bit half pulse coming from the second-branch;
   c) means of forming an interferometric structure that has minimal birefringence to insure that the optical delay experience by the two half pulses be the same, irrespective of their state of polarization; and
   d) a fiber heater for heating at least one of the branches between the couplers so as to obtain phase control of the interferometer.

2. An all-fiber phase controlled delay interferometer device according to claim 1, in which the two couplers are wavelength insensitive couplers which are maintained at close to 3 dB for at least 35 nm bandwidth.

3. An all-fiber phase controlled delay interferometer device according to claim 1, in which the two branches between the couplers have a U-shape.

4. An all-fiber phase controlled delay interferometer device according to claim 3, in which the rounded portion of the U-shape has a diameter between 12 mm and 15 mm so as to form a compact device.

5. An all-fiber phase controlled delay interferometer device according to claim 1, in which the fibers used for the interferometer are low birefringence fibers.

6. An all-fiber phase controlled delay interferometer device according to claim 1, in which the fibers of the two branches are in a de-stressed condition to minimize birefringence.

7. An all-fiber phase controlled delay interferometer device according to claim 1, in which the fiber heater is provided on the longer of the two branches.

8. An all-fiber phase controlled delay interferometer device according to claim 1, in which the fiber heater is a uniform metallic film on the branch.

9. An all-fiber phase controlled delay interferometer device according to claim 1, in which the fiber heater is a micro-wire on the branch.

10. An all-fiber phase controlled delay interferometer device according to claim 1, which is bonded onto a single substrate.

11. An all-fiber phase controlled delay interferometer device according to claim 10, in which the couplers are bonded to the substrate with hard bond points and the branches with soft bond points.

12. An all-fiber phase controlled delay interferometer device according to claim 11, in which the shape of the bond points is controlled so as to minimize induced birefringence, and the spacing of the bond points is adjusted so as to prevent fiber vibration to resonate below a predetermined limit.

13. An all-fiber phase controlled delay interferometer device according to claim 1, in which the two output fibers have substantially equal lengths.

14. An all-fiber phase controlled delay interferometer device according to claim 1, in which the length difference between the two output fibers produce a time-of-flight difference between the signals travelling therein smaller than 2% of the interferometer delay.

15. An all-fiber phase controlled delay interferometer device configured for use in an optical Differential Phase Shift Keying (DPSK) demodulation system, which comprises:
   a) two optical fiber couplers, each having two input and two output ports, the couplers being concatenated in series to form a two-branch interferometer, and having a splitting ratio close to 50% over the wavelength operating range of the device;

b) the two branches between the couplers being of unequal length and being shaped to a predetermined shape adapted to provide one bit of delay between the branches when pulses at the input of the interferometer are split into two halves, whereby one half pulse is delayed by one bit so as to interfere in the output coupler with the next bit half pulse coming from the second-branch;

c) means of forming an interferometric structure that has minimal birefringence to insure that the optical delay experience by the two half pulses be the same, irrespective of their state of polarization;

d) a fiber heater for heating at least one of the branches between the couplers so as to obtain an phase control of the interferometer; and e) a substrate to which the couplers are bonded with hard bond points and to which the branches are bonded with soft bond points.

16. An all-fiber phase controlled delay interferometer device according to claim 15, in which the shape of the bond points is controlled so as to minimize induced birefringence, and the spacing of the bond points is adjusted so as to prevent fiber vibration to resonate below a predetermined limit.

17. An all-fiber phase controlled delay interferometer device configured for use in an optical Differential Phase Shift Keying (DPSK) demodulation system, which comprises:

a) two optical fiber couplers, each having two input and two output ports, the couplers being concatenated in series to form a two-branch interferometer, and having a splitting ratio close to 50% over the wavelength operating range of the device;

b) the two branches between the couplers being of unequal length and being shaped to a predetermined shape adapted to provide one bit of delay between the branches when pulses at the input of the interferometer are split into two halves, whereby one half pulse is delayed by one bit so as to interfere in the output coupler with the next bit half pulse coming from the second-branch;

c) means of forming an interferometric structure that has minimal birefringence to insure that the optical delay experience by the two half pulses be the same, irrespective of their state of polarization;

d) a fiber heater for heating at least one of the branches between the couplers so as to obtain an phase control of the interferometer; and e) two output fibers where the length difference therebetween produces a time-of-flight difference between the signals travelling therein smaller than 2% of the interferometer device delay.

* * * * *